United States Patent
Varkey et al.

(10) Patent No.: US 8,726,980 B2
(45) Date of Patent: May 20, 2014

(54) PERMANENT CABLE FOR SUBMERSIBLE PUMPS IN OIL WELL APPLICATIONS

(75) Inventors: Joseph Varkey, Sugar Land, TX (US); Allan D. Ross, Shreveport, LA (US); Hifzi Ardic, Sugar Land, TX (US); Willem A. Wijnberg, Houston, TX (US); Jushik Yun, Sugar Land, TX (US); Jose Ramon Lozano-Gendreau, Puebla (MX)

(73) Assignee: Schlumberger Technology Corporation, Sugar Land, TX (US)

( * ) Notice: Subject to any disclaimer, the term of this patent is extended or adjusted under 35 U.S.C. 154(b) by 455 days.

(21) Appl. No.: 13/034,254

(22) Filed: Feb. 24, 2011

(65) Prior Publication Data

US 2011/0240312 A1  Oct. 6, 2011

Related U.S. Application Data

(60) Provisional application No. 61/307,682, filed on Feb. 24, 2010.

(51) Int. Cl.
*E21B 43/00* (2006.01)
*E21B 23/00* (2006.01)

(52) U.S. Cl.
USPC .......... 166/66.4; 166/65.1; 166/385

(58) Field of Classification Search
USPC .............. 166/385, 66.4, 106, 65.1
See application file for complete search history.

(56) References Cited

U.S. PATENT DOCUMENTS

| | | | |
|---|---|---|---|
| 5,146,982 A | 9/1992 | Dinkins | |
| 6,863,124 B2 | 3/2005 | Arauz et al. | |
| 7,541,543 B2* | 6/2009 | Head | 174/102 R |
| 7,580,797 B2 | 8/2009 | Akram et al. | |
| 7,859,152 B2 | 12/2010 | Orban | |
| 7,896,079 B2 | 3/2011 | Dyer et al. | |
| 2005/0089419 A1 | 4/2005 | Arauz et al. | |
| 2005/0109515 A1 | 5/2005 | Watson et al. | |
| 2008/0196902 A1* | 8/2008 | Head | 166/381 |
| 2009/0145610 A1 | 6/2009 | Varkey et al. | |
| 2009/0242194 A1* | 10/2009 | Varkey et al. | 166/242.2 |
| 2009/0266536 A1* | 10/2009 | Fox et al. | 166/250.01 |
| 2010/0206554 A1* | 8/2010 | Neuhaus et al. | 166/244.1 |

FOREIGN PATENT DOCUMENTS

| | | |
|---|---|---|
| EP | 2077374 A1 | 7/2009 |
| WO | 2006070314 A1 | 7/2006 |

OTHER PUBLICATIONS

PCT/US2011/026058—International Search Report dated Sep. 28, 2011.

* cited by examiner

*Primary Examiner* — Brad Harcourt
(74) *Attorney, Agent, or Firm* — Brandon S. Clark

(57) ABSTRACT

A technique facilitates the employment of an electric submersible pumping system or other well system downhole into a wellbore. The electric motor system is coupled with a signal carrying cable for conveyance to a desired downhole location in the wellbore. The signal carrying cable is constructed with sufficient strength to solely support the electric motor system during deployment and use in the wellbore without addition of a separate supporting mechanism.

12 Claims, 4 Drawing Sheets

PERMANENT CABLE FOR SUBMERSIBLE PUMPS IN OIL WELL APPLICATIONS

CROSS-REFERENCE TO RELATED APPLICATION

The present document is based on and claims priority to U.S. Provisional Application Ser. No. 61/307,682, filed Feb. 24, 2010 incorporated herein by reference.

BACKGROUND

Electric motors often are placed downhole in an oil or gas field to perform a variety of functions. For example, an electric motor may be placed downhole to perform an artificial lift function in which the motor drives a pump used to bring downhole fluids to the surface. The electric motors and associated pumping system components, e.g. an electric submersible pumping system, are deployed downhole and supported by various conveyance mechanisms, such as production tubing, coiled tubing, wireline or slickline. Because the electric motor requires power, cables or other electrical power conductors are run downhole along the supporting conveyance mechanism. However combination of the supporting conveyance mechanism and separate electrical power conductor can present difficulties due to expense, complexity, and other factors associated with the separate systems.

SUMMARY

In general, the present application provides a technique for deploying an electric motor system, such as an electric submersible pumping system, downhole into a wellbore. The electric motor system is coupled with a signal carrying cable for conveyance to a desired downhole location in the wellbore. The signal carrying cable is constructed with sufficient strength to solely support the electric motor system during deployment into the wellbore without addition of a separate supporting mechanism. The signal carrying cable may be used to convey, maintain and/or retrieve the electric motor system without additional support.

BRIEF DESCRIPTION OF THE DRAWINGS

Certain embodiments will hereafter be described with reference to the accompanying drawings, wherein like reference numerals denote like elements, and.

DETAILED DESCRIPTION

Figure 1:
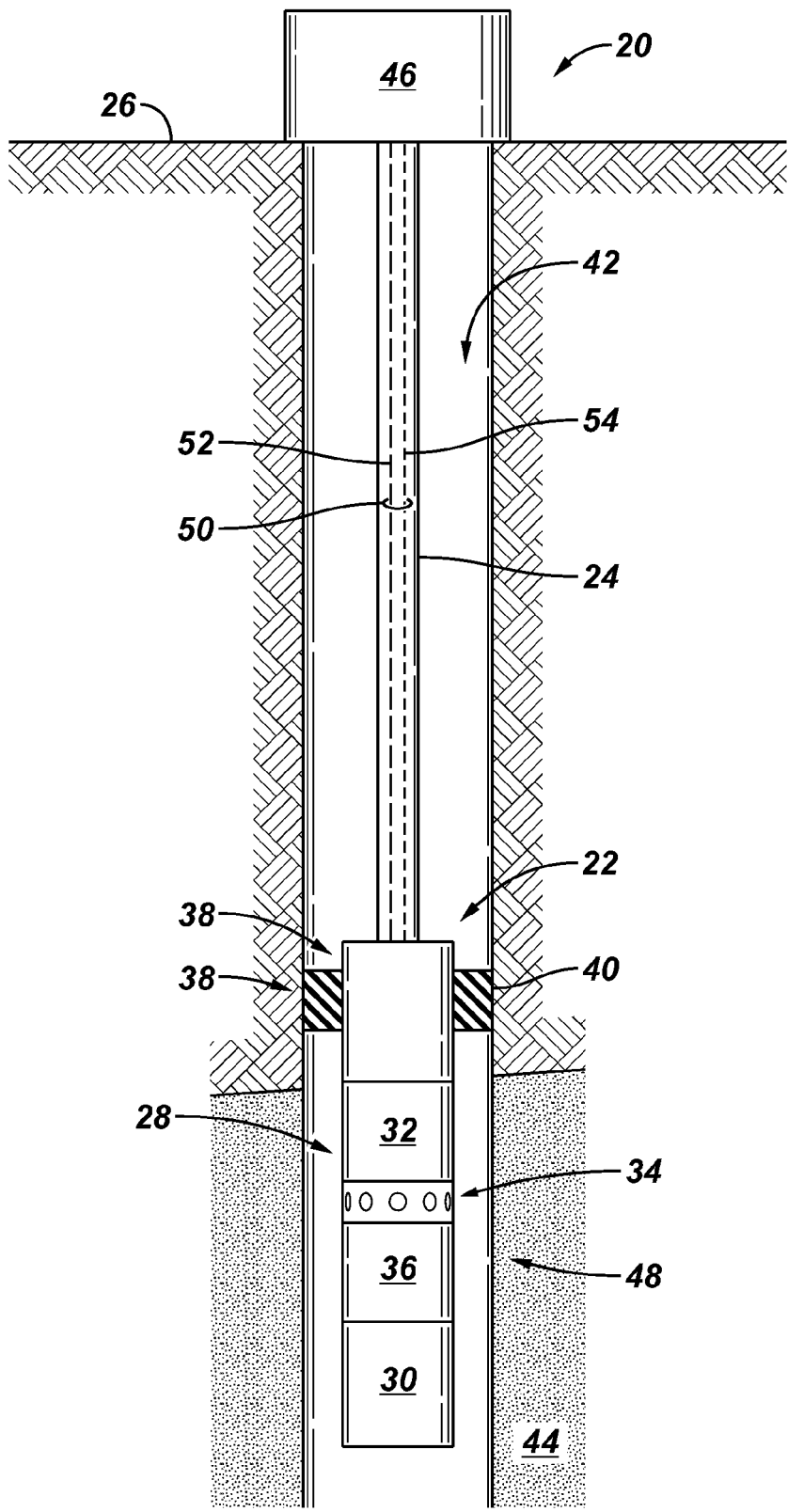
FIG. 1 is a front elevation view of an electric submersible pumping system deployed in a wellbore with a signal carrying cable, according to an embodiment.

In the following description, numerous details are set forth to provide an understanding of various embodiments. However, it will be understood by those of ordinary skill in the art that these embodiments may be practiced without many of these details and that numerous variations or modifications from the described embodiments may be possible.

The present application generally involves a technique which simplifies deployment and signal transmission with respect to systems deployed downhole in a wellbore. For example, the technique enables both deployment and powering of electric motors, such as electric motors employed in electric submersible pumping systems. A cable is constructed with sufficient strength to support an electric submersible pumping system and/or other downhole systems during conveyance through the wellbore. No other support members, e.g. production tubing, coiled tubing, wireline or slickline, are utilized during conveyance and retrieval of the downhole system. The cable may even be used to provide sole support of the downhole system during its operation.

Many oil wells are able to rely on natural gas pressure to propel crude oil to the surface. In more mature oilfields where gas pressure has diminished or in wells with heavy oil, however, this natural pressure is not sufficient to bring the oil out of the well. In these instances, the oil must be pumped out of the wells.

Sucker rod pumps can been used to pump oil to the surface in low-pressure wells, but sucker rod pumps are often replaced with electric submersible pumping systems (ESPS), such as the REDA ESPS. REDA ESPS are centrifugal electric submersible pumps. The electric submersible pumping systems comprise one or more submersible pumps and submersible motors attached to the bottom of the production string to pump oil up from the bottom of the well. The pump portion comprises a series of rotors and stators to pump fluid. Electrical power is provided to the electric motor of the ESPS.

Separate "permanent" cables are designed for long-term deployment in the well. However, these cables generally do not have sufficient strength to carry the cable weight combined with the weight of the pumping system. Therefore, these systems often require an additional element for support.

Some embodiments described herein eliminate the need for a support element by providing a cable with sufficient strength to be used as support during deployment and retrieval of the ESPS and/or other downhole system. These embodiments are constructed as permanent cables for use with submersible motors/pumps, such as those employed in electric submersible pumping systems for extracting oil from low-pressure wells. In some embodiments, the cables provide support and power to the electric submersible pumping systems while withstanding the conditions of long-term exposure in the downhole environment. Also, some cable embodiments described herein may be designed to present a smooth surface which allows for sealing pressure at the top of the well.

Additionally, embodiments of the cable may comprise data carriers, such as one or more optical fibers, which may be used to provide telemetry of depth-referenced data such as temperature, strain, and other parameters. A variety of optical fiber designs and other data carrier designs may be incorporated into the cable. Generally, the data carriers are protected by the cable design to enable use in permanent cables, such as permanent cables employed with electric submersible pumping systems used to extract oil from low-pressure wells. The cables have sufficient strength to provide support during conveyance and use, to provide power and/or data transmission with respect to the electric submersible pumping system, and to withstand the conditions of long-term exposure in the downhole environment.

Referring generally to FIG. 1, an example of a well system 20 is illustrated. In this embodiment, a downhole assembly 22 is solely supported by a cable 24 which is also able to carry signals between the downhole assembly 22 and a surface location 26. In the particular embodiment illustrated, downhole assembly 22 comprises an electric submersible pumping system 28 which may have a variety of components. For example, the electric submersible pumping system 28 may comprise a submersible electric motor 30 which powers a submersible pump 32, such as a submersible centrifugal pump. The electric submersible pumping system 28 also may comprise other components, such as a pump intake 34 and a motor protector 36. Depending on the application, the downhole assembly 22 also may incorporate other components 38, such as one or more packers 40 used to isolate regions of the wellbore 42.

In the embodiment illustrated, wellbore 42 is formed in a subterranean formation 44 and may comprise generally vertical and/or deviated sections. The wellbore 42 extends down from the surface location 26 beneath surface equipment, such as a wellhead 46. Cable 24 is a permanent cable and supports its own full weight and the weight of the electric submersible pumping system 24. In other words, no other support members are required to convey electric submersible pumping system 28 through wellbore 42 during deployment to a desired downhole location 48 in wellbore 42. Similarly, no other support members are required during retrieval from the wellbore 42. Cable 24 is permanent in the sense that it remains downhole while being functionally attached to the downhole assembly 22 during operation of the downhole assembly 22 for production of oil or performance of other desired functions.

As illustrated, cable 24 comprises at least one signal carrier 50 along which signals may be carried to and/or from the downhole assembly 22. By way of example, signal carrier 50 may comprise a power carrier 52, such as one or more conductors routed along the cable 24. Signal carrier 50 also may comprise a data carrier 54, such as one or more optical fibers or other data carriers routed along cable 24. The design of cable 24 provides a flexible member while also providing sufficient strength to serve as the sole support member in conveying the electric submersible pumping system 28 and/or other downhole systems through wellbore 42.

In one embodiment, cable 24 is formed of a plurality of layers of armor wire strength members which are isolated by a plurality of separation layers, such as polymer layers. The armor wire strength members can have interstices. The layers of armor wire strength members surround the signal carrier 50 which may comprise power and/or data carriers. Additionally, the polymer layers may comprise one or more types of polymer materials able to provide protection and/or insulation.

Some embodiments of cable 24 employ plural, e.g., three or four, different types of non-metallic layers, and e.g. polymer materials/layers although other non-metallic materials may be employed in some applications. For example, a polymer 1 may comprise an electrical insulation which is used, for example, to insulate conductors, e.g. large copper electrical power conductors, in a core of the cable 24. This first polymer also may be formed from various combinations of polymer materials. According to embodiments, polymer 1 can comprise the polymeric materials useful in the cables and may include polyolefins (such as EPC, modified EPC or polypropylene), Ethylene Propylene Diene Monomer (EPDM), Ethylene-Propylene Octane, Ethylene Propylene block copolymer, polyaryletherether ketone, polyaryl ether ketone, polyphenylene sulfide, polymers of ethylene-tetrafluoroethylene, polymers of poly(1,4-phenylene), polytetrafluoroethylene, perfluoroalkoxy polymers, fluorinated ethylene propylene, perfluoromethoxy polymers, Parmax®, and any mixtures thereof. According to some embodiments, the polymers can include polymeric materials such as Ethylene Propylene Diene Monomer, polypropylene, Ethylene Propylene block polymer, perfluoroalkoxy polymer, and perfluoromethoxy polymer. A polymer 2 may comprise a softer polymer material which is used as an interstitial filler if needed. The interstitial filler may be positioned around, for example, the conductors in the cable core which are insulated by polymer 1. Examples of polymer 2 can comprise of any soft polymer with a Shore A hardness between 10 and 100 may be used like Santoprene, thermoplastic Fluoro elastomers, Ethylene-Propylene co-polymers, Ethylene Propylene block copolymer or any other soft thermoplastic elastomers or thermoplastic.

Additionally, a polymer 3 may be employed as, an outer jacket to the cable core. Polymer 3 generally is a harder polymer able to provide protection of the cable core or other cable components. Polymer 3 can comprise polymers that can be used as is or reinforced with, carbon, glass, aramid or any other suitable natural or synthetic fiber and or any other reinforcing additives such as micron sized PTFE, Graphite, Ceramer™ are by nonlimiting example, polyolefins (such as EPC, modified EPC or polypropylene), polyaryletherether ketone, polyaryl ether ketone, polyphenylene sulfide, polymers of ethylene-tetrafluoroethylene, polymers of poly(1,4-phenylene), polytetrafluoroethylene, perfluoroalkoxy polymers, fluorinated ethylene propylene, perfluoromethoxy polymers, Parmax®, and any mixtures thereof. Preferred polymeric materials are polypropylene, ethylene-tetrafluoroethylene polymer, perfluoroalkoxy polymer, and perfluoromethoxy polymer. Also, a polymer 4 may be employed to protect the layers of armor wire strength members. Examples of polymer 4 can comprise a protective polymeric coating that is applied to each strand of armor wire for corrosion protection. The following coatings may be used: fluoropolymer coating, FEP, Tefzel®, PFA, PTFE, MFA, PEEK or PEK with fluoropolymer combination, PPS and PTFE combination, and Latex or Rubber Coating. Each strand of armor wire may also be plated with a 0.5-mil to 3-mil metallic coating which may enhance bonding of the armor wires to the polymeric jacket materials. The plating materials may include: Tough-Met® (a high-strength, copper-nickel-tin alloy manufactured by Brush Wellman), Brass, Copper, Copper alloy, Nickel and its alloys, and any other suitable metals or combination of the same. Of course, the specific arrangement of polymer layers and polymer material types may be changed or substituted according to the needs of a given application and environment. One or more of the polymers 1, 2, 3, and 4 may be used to create the desired cable 24 for a specific downhole application and environment. Further, the first polymer layer can be chemically bonded to the second polymer later through the interstices of the first armor layer. The second polymer layer can be chemically bonded to the third polymer layer through interstices of the second armor layer. This configuration is available for any two polymer layers separated by an armor layer.

Figure 2:
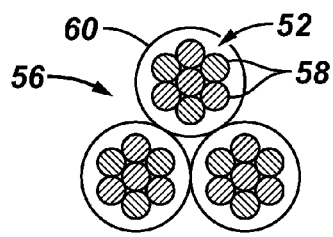
FIG. 2 is a cross-sectional view of a first stage of cable construction in forming an embodiment of a cable with sufficient strength to support the electric submersible pumping system, according to an embodiment.

Referring generally to FIGS. 2-9, one embodiment of cable 24 is illustrated in sequential stages of construction. In this embodiment, a cable core 56 is initially constructed with one or more conductors 58 that form power carrier 52, as illustrated in FIG. 2. The conductors may be constructed from a variety of conductive materials in a variety of forms, e.g. copper conductors each formed of a solid copper element or of copper strands. By way of example, the cable core 56 may comprise three conductors 58 to enable delivery of three-phase power to motor 30 of the electric submersible pumping system 28. In the example of FIG. 2, the three conductors, e.g. three large copper conductors, are cabled together in a triad configuration. Additionally, each conductor 58 is covered by a layer of electrical insulation material 60. By way of example, insulation material 60 may be formed from polymer 1.

Figure 3:
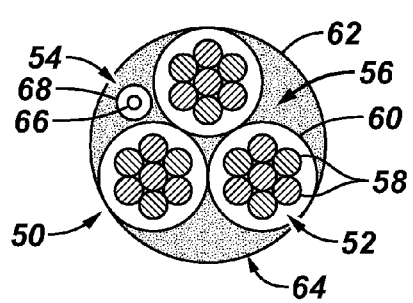
FIG. 3 is a cross-sectional view of a subsequent stage of cable construction, according to an embodiment.

In this example, another layer of material 62 is placed around cable core 56, as illustrated in FIG. 3. The layer of material 62 may be used to fill interstitial spaces between conductors 58 and also may be designed to create an outer circular profile 64. By way of example, the layer of material 62 may be formed from a softer polymer material, such as polymer 2. Additionally, the layer of material 62 may be used to surround one or more data carriers 54 which can be constructed as part of cable core 56 or routed through other regions of the overall cable 24. By way of example, data carrier 54 comprises an optical fiber 66 enclosed in a protective layer or tube 68.

Figure 4:
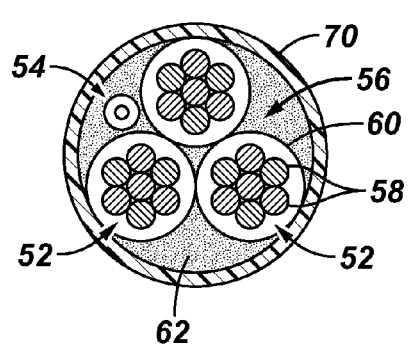
FIG. 4 is a cross-sectional view of a subsequent stage of cable construction, according to an embodiment.
Figure 5:
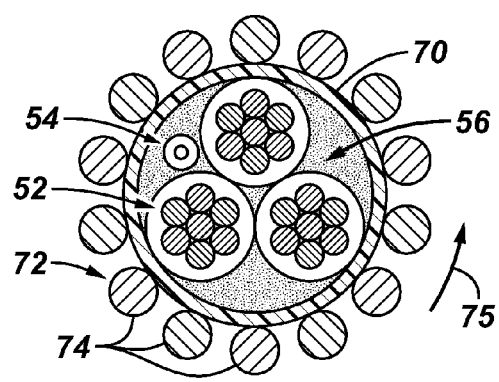
FIG. 5 is a cross-sectional view of a subsequent stage of cable construction, according to an embodiment.

Referring generally to FIG. 4, another layer of material 70 may be placed over layer of material 62. By way of example, layer of material 70 may be formed from a harder, protective polymer, such as polymer 3, and it may be extruded as a jacket layer over material 62. Additionally, material 70 is disposed along a radial interior of a first layer 72 of armor wire strength members 74, as illustrated in FIG. 5. The layer of armor wire strength members 74 may be cabled over layer 70 at a desired lay angle (see arrow 75). Depending on the environment in which cable 24 is employed, armor wire strength members 74 may be formed from a variety of materials. However, the selected materials should be sufficiently strong to assist in supporting the full weight of both cable 24 and downhole assembly 22 during conveyance downhole and retrieval. For example, the armor wire strength members 74 may be constructed from a suitable metal, such as a, Galvanized Improved Plow Steel of different carbon content, Stainless steel, Copper-clad steel, Aluminum-clad steel, Anodized Aluminum-clad steel, Titanium-clad steel, Alloy 20Mo6HS, Alloy GD31Mo, Austenitic Stainless Steel, High Strength Galvanized Carbon Steel, Titanium clad copper, or any other suitable strength members.

Figure 6:
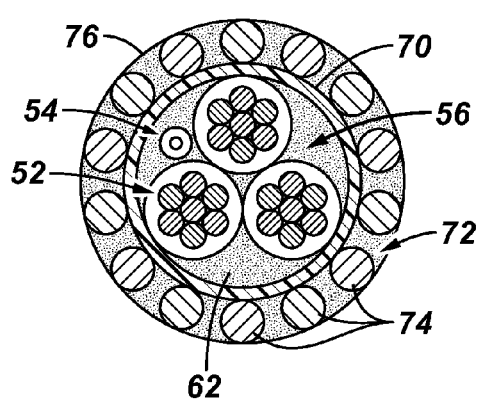
FIG. 6 is a cross-sectional view of a subsequent stage of cable construction, according to an embodiment.
Figure 7:
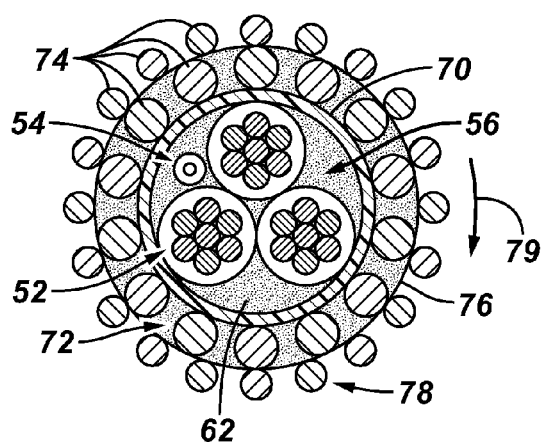
FIG. 7 is a cross-sectional view of a subsequent stage of cable construction, according to an embodiment.

Another layer of material 76 is located over the first layer 72 of armor wire strength members 74, as illustrated in FIG. 6. By way of example, the layer of material 76 may comprise a polymer layer formed of a suitable polymer, such as polymer 4. In some embodiments, layer of material 76 is extruded over the first armor wire layer 72. A second layer 78 of armor wire strength members 74 may be positioned around layer of material 76, as illustrated in FIG. 7. The second layer 78 of armor wire strength members 74 may be cabled over layer of material 76 at a desired lay angle (see arrow 79) different from the lay angle of the first armor wire layer 72. For example, the lay angle of armor wire strength members 74 of the second layer 78 may be arranged contrahelically with respect to the lay angle of armor wire strength members 74 of the first layer 72. The layer of material 76 and layer of material 70 may be chemically bonded to one another though interstices of the strength members 74.

Figure 8:
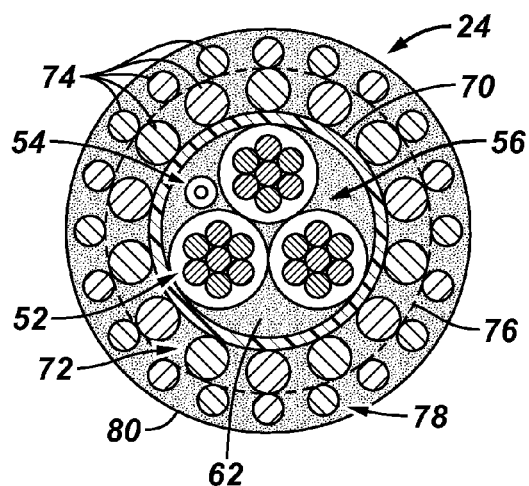
FIG. 8 is a cross-sectional view of a subsequent stage of cable construction to create an embodiment of the system supporting cable, according to an embodiment.
Figure 9:
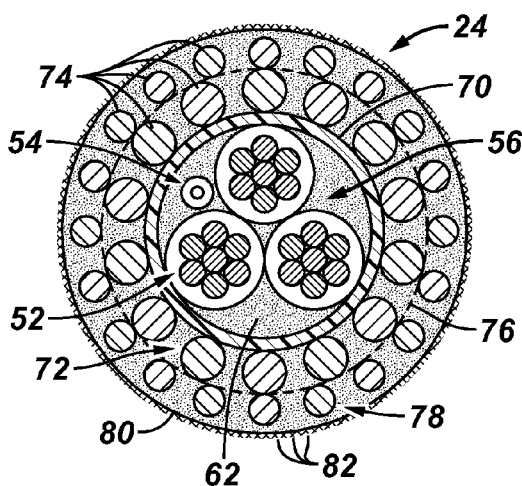
FIG. 9 is a cross-sectional view of another cable construction, according to an embodiment.

As illustrated in FIG. 8, another layer of material 80 may be located over the second armor wire layer 78 to complete formation of the cable 24. By way of example, the layer of material 80 comprises a polymer layer formed of a suitable polymer, such as polymer 4. In some embodiments, layer of material 80 is extruded over the second armor wire layer 78. The material 80 can be selected to provide a smooth outer surface which facilitates sealing against pressure at the top of the wellbore 42. Additionally, a variety of enhancers 82 may be added to layer 80 to enhance desired cable properties, such as strength and abrasion resistance, as illustrated in FIG. 9. The enhancers 82 comprise, for example, fibers, beads, or other materials designed to achieve the desired, enhanced cable properties. The layer 76 can be chemically bonded to the layer 80 through interstices of the armor wire layer 78.

The various cable layers can be arranged in various configurations to achieve the desired high strength cable 24 able to convey and retrieve the electric submersible pumping system 28 without addition of another support component. For example, another embodiment of cable 24 is a coaxial cable illustrated in sequential stages of construction in FIGS. 10-17. Elements of the alternate embodiment which are the same or similar to elements of the embodiment illustrated in FIGS. 2-9 may be labeled with common reference numerals.

Figure 10:
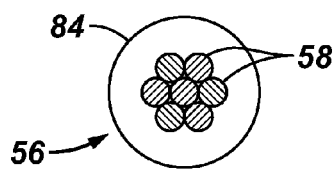
FIG. 10 is a cross-sectional view of a first stage of cable construction in forming an alternate embodiment of a cable with sufficient strength to support a downhole system, according to an embodiment.
Figure 11:
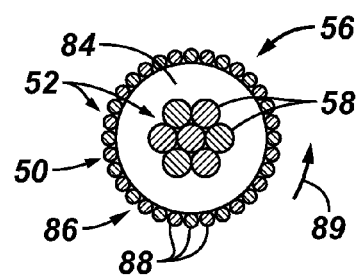
FIG. 11 is a cross-sectional view of a subsequent stage of cable construction, according to an alternate embodiment.

In this alternate embodiment, the cable core 56 is initially formed with one internal conductor 58 which may be formed as a solid member or as a plurality of strands, as illustrated in FIG. 10. The single, large conductor 58 may be surrounded by an insulation material 84, e.g. a polymer insulation material, which is surrounded by a conductive layer 86 sometimes formed as a layer of smaller conductors 88 as further illustrated in FIG. 11. The layer of smaller conductors 88 may be cabled (or served) around the center connector 58 at a desired lay angle (see arrow 89) to provide a shield of the coaxial cable. By way of example, center conductor 58 and conductive layer 86 may be formed of a conductive metal, such as copper.

Figure 12:
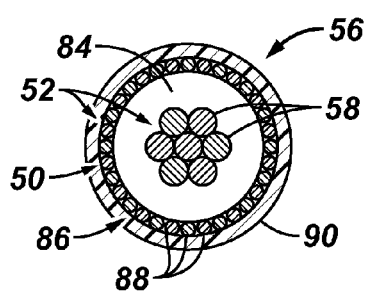
FIG. 12 is a cross-sectional view of a subsequent stage of cable construction, according to an alternate embodiment.
Figure 13:
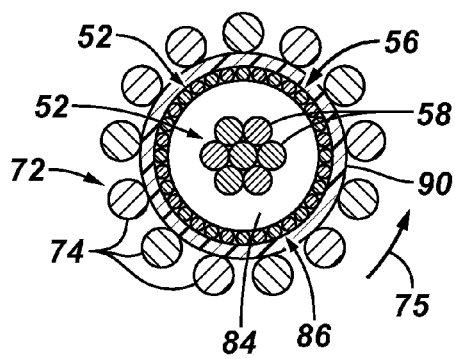
FIG. 13 is a cross-sectional view of a subsequent stage of cable construction, according to an alternate embodiment.

Additionally, a layer of material 90 may be placed around cable core 56, as illustrated in FIG. 12. By way of example, layer of material 90 may be formed from a harder, protective polymer, such as polymer 3. In some embodiments, the layer of material 90 is extruded as a jacket layer over conductive layer 86 to protect the cable core 56. Material 90 is disposed along a radial interior of the first layer 72 of armor wire strength members 74, as illustrated in FIG. 13. The layer of armor wire strength members 74 may be cabled over layer of material 90 at a desired lay angle (see arrow 75). Depending on the environment in which cable 24 is employed, armor wire strength members 74 can be formed from a variety of materials. However, the selected materials should again be sufficiently strong to assist in supporting the full weight of both cable 24 and downhole assembly 22 during conveyance downhole and retrieval. For example, the armor wire strength members 74 may be constructed from a suitable metal, such as a stainless steel. The layer of material 90 could be chemically connected with insulation material 84.

Figure 14:
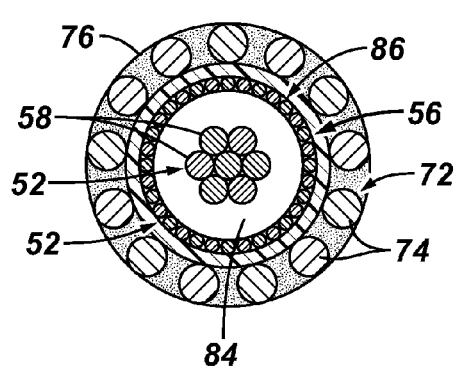
FIG. 14 is a cross-sectional view of a subsequent stage of cable construction, according to an alternate embodiment.
Figure 15:
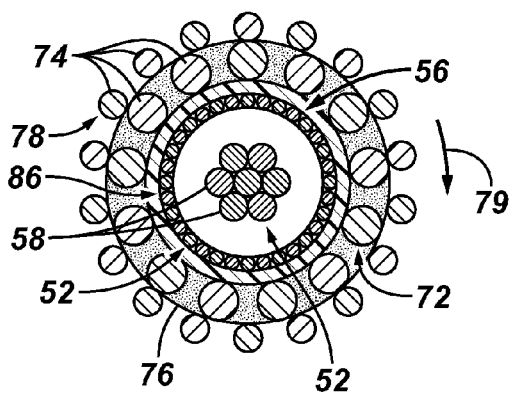
FIG. 15 is a cross-sectional view of a subsequent stage of cable construction, according to an alternate embodiment.

As with the embodiment illustrated in FIGS. 2-9, the layer of material 76 may be located over the first layer 72 of armor wire strength members 74, as illustrated in FIG. 14. By way of example, the layer of material 76 comprises a polymer layer formed of a suitable polymer, such as polymer 4, and it can be extruded over the first armor wire layer 72. The second layer 78 of armor wire strength members 74 is similarly positioned around layer of material 76, as illustrated in FIG. 15. The second layer 78 of armor wire strength members 74 may be cabled over layer of material 76 at a desired lay angle (see arrow 79) different from the lay angle of the first armor wire layer 72. For example, the lay angle of armor wire strength members 74 of the second layer 78 may be arranged contrahelically with respect to the lay angle of armor wire strength members 74 of the first layer 72.

Figure 16:
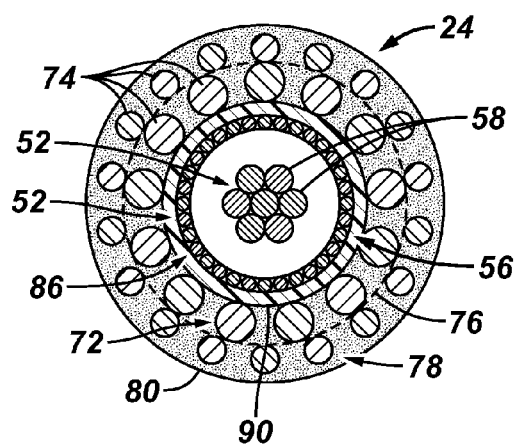
FIG. 16 is a cross-sectional view of a subsequent stage of cable construction to create another example of a system supporting cable, according to an embodiment.
Figure 17:
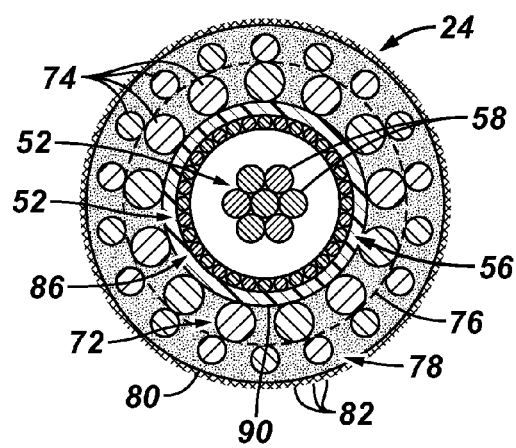
FIG. 17 is a cross-sectional view of another cable construction, according to an alternate embodiment.

As illustrated in FIG. 16, the layer of material 80 may be similarly located over second armor wire layer 78 to complete formation of the cable 24. Again, the layer 80 may comprise a polymer layer formed of a suitable polymer, such as polymer 4, and it can be extruded over the second armor wire layer 78. The layer 80 could be chemically connected with the layer 76 through interstices of the armor layers. Enhancers 82 also may again be added to layer of material 80 to enhance desired cable properties, such as strength and abrasion resistance, as illustrated in FIG. 17. As discussed above, the enhancers 82 may comprise fibers, beads, or other materials designed to achieve the desired, enhanced cable properties. One or more data carriers 54 also may be routed along cable 24 within core 56 or at another suitable location outside conductive layer 86.

Although embodiments of well system 20, downhole assembly 22 and cable 24 have been illustrated and described, many variations in components and designs may be employed for a given application and/or environment. For example, a variety of electric submersible pumping system components may be incorporated into the design. Additionally, the downhole electric motor may be combined with other types of pumping systems or downhole systems powered by electric motors.

Cable 24 may be employed to convey and/or retrieve a variety of other heavy systems to or from downhole environments. Various embodiments illustrated, cable 24 provides sufficient strength to convey electric submersible pumping system 28 and other types of downhole systems to desired location 48 in wellbore 42 by combining flexible layers of polymer and flexible layers of armor wire strength members. Various embodiments illustrated and described are readily capable of delivering the electric submersible pumping system 28 to well depths exceeding 1000 feet, 5000 feet, and even wells in excess of 10,000 feet deep without requiring an additional support member during conveyance and/or retrieval of the downhole system. Depending on the specific parameters of a given application and wellbore environment, the number, materials, and arrangements of the cable layers may be adjusted to accommodate the specific parameters.

Although only a few embodiments have been described in detail above, those of ordinary skill in the art will readily appreciate that many modifications are possible without materially departing from the teachings of this application. Accordingly, such modifications are intended to be included within the scope of this invention as defined in the claims.

What is claimed is:

1. A system to convey and support an electric submersible pumping system downhole in a wellbore, comprising:
   an internal conductor;
   a conductor layer surrounding the internal conductor;
   a first layer of polymer positioned around the conductor layer;
   a first layer of armor wire strength members cabled over the first layer of polymer at a first lay angle;
   a second layer of polymer positioned over the first layer of armor wire strength members;
   a second layer of armor wire strength members cabled over the second layer of polymer at a second lay angle; and
   a third layer of polymer surrounding the second layer of armor wire strength members to create a cable with sufficient strength to support the electric submersible pumping system during conveyance downhole to a desired operational location in the wellbore
   wherein the first layer of polymer is chemically bonded to the second layer of polymer through interstices in the first layer of armor and the second layer of polymer is chemically bonded to the third layer of polymer through interstices in the second layer of armor.

2. The system as recited in claim 1, wherein the first, second and third layers of polymer comprise a plurality of different types of polymer materials.

3. The system as recited in claim 1, wherein the second lay angle is arranged contrahelically with respect to the first lay angle.

4. The system of claim 1 further comprising at least one optical fiber configured to provide strain data.

5. A system to convey and support an electric submersible pumping system downhole in a wellbore, comprising:
   an internal conductor;
   a conductor layer surrounding the internal conductor;
   a first layer of polymer positioned around the conductor layer;
   a first layer of armor wire strength members cabled over the first layer of polymer at a first lay angle;
   a second layer of polymer positioned over the first layer of armor wire strength members;
   a second layer of armor wire strength members cabled over the second layer of polymer at a second lay angle; and
   a third layer of polymer surrounding the second layer of armor wire strength members to create a cable with sufficient strength to support the electric submersible pumping system during conveyance downhole to a desired operational location in the wellbore
   wherein the first layer of polymer is chemically bonded to the second layer of polymer through interstices in the first layer of armor.

6. The system as recited in claim 5, wherein the first, second and third layers of polymer comprise a plurality of different types of polymer materials.

7. The system as recited in claim 5, wherein the second lay angle is arranged contrahelically with respect to the first lay angle.

8. The system of claim 5 further comprising at least one optical fiber configured to provide strain data.

9. A system to convey and support an electric submersible pumping system downhole in a wellbore, comprising:
   an internal conductor;
   a conductor layer surrounding the internal conductor;
   a first layer of polymer positioned around the conductor layer;

a first layer of armor wire strength members cabled over the first layer of polymer at a first lay angle;
a second layer of polymer positioned over the first layer of armor wire strength members;
a second layer of armor wire strength members cabled over the second layer of polymer at a second lay angle; and
a third layer of polymer surrounding the second layer of armor wire strength members to create a cable with sufficient strength to support the electric submersible pumping system during conveyance downhole to a desired operational location in the wellbore
wherein the second layer of polymer is chemically bonded to the third layer of polymer through interstices in the second layer of armor.

10. The system as recited in claim 9, wherein the first, second and third layers of polymer comprise a plurality of different types of polymer materials.

11. The system as recited in claim 9, wherein the second lay angle is arranged contrahelically with respect to the first lay angle.

12. The system of claim 9 further comprising at least one optical fiber configured to provide strain data.

\* \* \* \* \*